United States Patent [19]

Mizrahi

[11] Patent Number: 4,882,134

[45] Date of Patent: Nov. 21, 1989

[54] RECOVERY OF HYDROGEN FLUORIDE FROM AN AQUEOUS SOLUTION CONTAINING AMMONIUM FLUORIDE AND HYDROGEN FLUORIDE

[75] Inventor: Joseph Mizrahi, Haifa, Israel

[73] Assignee: IMC Fertilizer, Inc., Northbrook, Ill.

[21] Appl. No.: 37,160

[22] Filed: Apr. 10, 1987

[51] Int. Cl.$^4$ .................. C01B 7/19; C01B 21/087; C01B 21/088

[52] U.S. Cl. .................................. 423/356; 423/471; 423/483; 423/484

[58] Field of Search ............... 423/483, 484, 488, 356, 423/471

[56] References Cited

U.S. PATENT DOCUMENTS

| | | |
|---|---|---|
| 2,388,135 | 0/1945 | Frey . |
| 2,400,874 | 5/1946 | Burk ..................... 423/483 |
| 2,400,875 | 5/1946 | Hughes et al. . |
| 3,101,254 | 8/1963 | Cunningham . |
| 3,106,449 | 10/1963 | Fitch . |
| 3,128,152 | 4/1964 | Secord et al. . |
| 3,186,809 | 6/1965 | Kreevoy ..................... 423/488 |
| 3,314,755 | 4/1963 | Claus . |
| 3,316,060 | 4/1967 | Dexter et al. . |
| 33,338,673 | 8/1967 | Peterson et al. . |
| 3,431,071 | 3/1969 | Simpson et al. . |
| 3,705,007 | 12/1972 | Lichstein ..................... 423/471 |
| 3,773,907 | 11/1973 | Blochl et al. . |
| 3,914,398 | 10/1975 | Faust . |
| 4,089,936 | 5/1978 | Thompson et al. . |
| 4,115,530 | 9/1978 | Coenen et al. . |
| 4,144,315 | 3/1979 | Worthington et al. . |
| 4,291,007 | 9/1981 | Baniel ..................... 423/488 |
| 4,305,917 | 12/1981 | Coenen et al. ..................... 423/356 |

FOREIGN PATENT DOCUMENTS 0057608 of 1982 European Pat. Off. .
64712 of 1984 Israel .
1137037 12/1968 United Kingdom .

OTHER PUBLICATIONS

Hardwick and Ware, "Hydrofluoric Acid Recovery by Amine Solvent Extraction", Chemical and Process Engineering, Jun. 1965, pp. 283–293.
Chemical and Process Engineering, Jun. 1965, pp. 283–293, "Hydrofluoric Acid Recovery by Amine Solvent Extraction" by Hardwick and Wace.
Eyal et al., Solvent Extraction and Ion Exchange, 1986, pp. 803–821, "Sulfuric Acid Recovery through Solvent Aided Decomposition of Ammonium Sulfate".

Primary Examiner—Jeffrey E. Russel
Attorney, Agent, or Firm—Banner, Birch, McKie & Beckett

[57] ABSTRACT

A method of recovering HF from an aqueous solution containing $NH_4F$ and HF is provided. The solution is contacted with a water-immiscible, amine-containing extractant which extracts HF in preference to $NH_4F$. The HF:$NH_4F$ molar ratio of the solution, the amine, the concentration of the amine in the extractant and the contact temperature are selected so as to form an HF-loaded organic liquid phase having an HF:amine molar ratio of at least about 1.2. The extractant is preferably selected from amines, amine-HF complexes, quaternary amine fluorides and mixtures thereof with inert organic diluents. After equilibration, the HF-loaded amine is separated from the solution and HF is stripped therefrom in an amount sufficient to lower the HF:amine molar ratio by at least about 0.2.

14 Claims, No Drawings

RECOVERY OF HYDROGEN FLUORIDE FROM AN AQUEOUS SOLUTION CONTAINING AMMONIUM FLUORIDE AND HYDROGEN FLUORIDE

BACKGROUND OF THE INVENTION

1. Field of the Invention

The present invention relates to a method of recovering hydrogen fluoride from an aqueous solution containing ammonium fluoride and hyrdrogen fluoride and more particularly to such a method of recovery utilizing an organic liquid extractant.

2. Description of the Prior Art

Hydrofluoric acid has been commercially produced by treating fluorspar with sulfuric acid yielding hydrogen fluoride gas and calcium sulfate. The hydrogen fluoride thus produced contains varying amounts of inert contaminants such as carbon dioxide, air, water vapor, sulfur dioxide, fluosilicic acid and silicon tetrafluoride derived from silica impurities in the fluorspar. The removal of these contaminants, especially fluosilicic acid, has proved troublesome and expensive. In addition, the cost of the raw materials (low impurity fluospar and sulfuric acid) used in this process has risen in recent years.

In response to the rising cost of hydrofluoric acid production from fluorspar, a number of substitute processes have been devised. For example, the phosphate rock fertilizer industry has long been plagued by the problem of waste by-product fluorine compounds, principally fluosilicic acid and silicon tetrafluoride. These fluorine compounds comprise environmentally polluting waste products.

The industry has developed a number of processes for converting these waste fluorine compounds into marketable hydrogen fluoride. In one process, silicon tetrafluoride is sparged through water to precipitate silica and form fluosilicic acid. The fluosilicic acid thus produced is then concentrated, typically by evaporation of water and heated to produce a vapor phase containing hydrogen fluoride, silicon tetrafluoride and water. The hydrogen fluoride fraction of the vapor phase is then separated using a polyglycol extractant.

U.S. Pat. No. 3,128,152 discloses another method wherein fluosilicic acid is treated with ammonia or ammonium hydroxide to produce ammonium fluoride and solid silica. The silica is removed by any suitable means such as by filtration and the remaining ammonium fluoride solution is evaporated to crystallize out ammonium bifluoride. The ammonium bifluoride salt is then either heated until it decomposes or is oxidized at a high temperature in the presence of oxygen or air, to produce hydrogen fluoride and nitrogen. Unfortunately, these processes are economically unattractive due to the high temperatures required and because some of the ammonia is lost as nitrogen gas.

In another method, ammonium bifluoride is reacted with an alkali metal fluoride to form alkali metal bifluoride which is subsequently decomposed into hydrogen fluoride and alkali metal fluoride . The alkali metal fluoride is then recycled to the first reaction. Unfortunately, this method also suffers from high decomposition temperatures making the process economically unattractive.

Solvent extraction of hydrohalic acids from their solutions and stripping of the acids from the solvents has been described. Hardwick and Wace summarize in "Hydrofluoric Acid Recovery By Amine Solvent Extraction", Chemical and Process Engineering, June 1965, pp. 283–293, a detailed study of using undiluted tertiary amines for HF extraction from HF/water mixtures. They found that the HF extraction efficiency in an aqueous HF system was strongly dependent upon the HF concentration of the aqueous solution. They found that the amine was loaded with HF to achieve an HF:amine molar ratio of 0.05 while in equilibrium with a 0.1% HF solution and achieved an HF:amine molar ratio of 1.4 while in equilibrium with a 0.15% HF solution. As for the effect of temperature, they concluded that within the temperature range of 2° to 60° C. the partition coefficients were independent of temperature. The effects of amine dilution and amine strength were not studied.

Extraction of an acid from a solution of a salt of the acid has also been described. In several cases it was found that the extraction of the acid is enhanced by the presence of the salt. Thus for example, higher HCl loadings of the solvent were obtained in extraction from HCl—KCl—H$_2$O solutions than those obtained in extraction from HCl—H$_2$O solutions having similar HCl concentrations.

It is therefore an object of the present invention to provide a method of producing hydrogen fluoride from by-product fluosilicic acid without the attendant problems of the prior art processes such as high temperature decomposition and expensive raw materials.

It is another object of the present invention to provide a method of recovering hydrogen fluoride from an aqueous solution containing ammonium fluoride and hydrogen fluoride utilizing organic liquid extractants.

SUMMARY OF THE INVENTION

These and other objects of the invention are provided by a method of recovering hydrogen fluoride from an aqueous solution containing NH$_4$F and HF comprising contacting the solution with a wate-immiscible, amine-containing extractant which extracts HF in preference to NH$_4$F. One or more parameters selected from the group consisting of the HF:NH$_4$F molar ratio of the aqueous solution, the particular amine chosen for the extraction, the concentration of the amine in the extractant and the contact temperature are adjusted so that the amine achieves an HF loading of at least 1.2. The HF loading is defined as the HF:amine molar ratio of the amine-containing extractant while in equilibrium with the solution. The amine-containing extractant is preferably selected from the group consisting of amines, amine-HF complexes, quaternary amine fluorides and mixtures thereof with inert oroganic diluents. The HF-loaded amine extractant is then separated from the aqueous solution and hyrdorgen fluoride is stripped therefrom in an amount sufficient to lower the HF:amine molar ratio by at least about 0.2. The stripped amine extractant can then be recycled to the contacting stage.

In one embodiment of the invention, the aqueous solution containing NH$_4$F and HF may be obtained, and the HF:NH$_4$F molar ratio thereof adjusted, by evaporating ammonia from an aqueous ammonium fluoride solution.

DETAILED DESCRIPTION

In its broadest sense, the present invention comprises a method of recovering HF from an aqueous solution containing $NH_4F$ and HF. These solutions are not simple mixtures of HF and $NH_4F$ but actually comprise complex systems having a number of ionic species and undissociated molecular entities, many of which are not present in simple HF/water system. For instance, the system obtained by evaporating $NH_3$ from an $NH_4F$ solution may contain $NH_4HF_2$, $NH_4F$, HF, $H^+$, $F^-$, $HF_2^-$, and possibly others. For simplicity of description, they will be referred to in the following as solutions containing HF and $NH_4F$.

It has been found that combining the principles for extracting HF from $HF/H_2O$ mixtures with the principles for extracting acids from their salt solutions does not provide the teachings necessary to efficiently extract HF from solutions containing HF and $NH_4F$. It was found that as in extraction of HF from $HF/H_2O$ mixtures, there is a stage where small changes in the equilibrium parameters drive the system from inefficient extraction to efficient extraction. However, unlike $HF/H_2O$ mixtures, HF concentration is not the parameter which determines HF extraction efficiency from solutions containing HF and $NH_4F$. Thus, doubling the HF concentration in one case (Example 1) had almost no effect on solvent loading (a measure of extraction efficiency) while in another case (Example 2) solutions having similar HF concentrations resulted in widely varying solvent loadings. It was found that one of the determining parameters is the $HF:NH_4F$ molar ratio. Unlike in extraction of HCl from HCl and KCl solutions, in the case of aqueous solutions containing HF and $NH_4F$, the presence of the $NH_4F$ interferes with HF extraction and limits it.

It has also been found that unlike HF extraction from $HF/H_2O$ mixtures, temperatures is an important parameter. It was also found that amine strength and amine dilution can also effect the efficiency of the extraction of HF from aqueous solutions containing HF and $NH_4F$.

Thus, maximum efficiency of recovery of HF from an aqueous solution containing $NH_4F$ and HF can be obtained by controlling the following parameters: (1) the $HF:NH_4F$ molar ratio of the solution, (2) the contact or equilibrium temperature (3) the concentration of the amine in the extractant, and (4) the strength of the amine (i.e., by choosing an amine having the appropriate strength). Surprisingly, the concentration of HF in the aqueous $NH_4F$ solution is not the determining parameter as it is in systems containing only HF and water.

The recovery of HF from an aqueous solution containing HF and $NH_4F$ is accomplished by contacting the solution with a water-immiscible, amine containing extractant which extracts HF in preference to $NH_4F$. The $HF:NH_4F$ molar ratio of the solution, the amine, the concentration of the amine in the extractant and the contact temperature are adjusted so that the amine achieves an HF loading of at least about 1.2.

The extractant may be an amine which is immiscible in the aqueous solution containing $NH_4F$ and HF. Generally speaking, suitable amines include primary, secondary and tertiary amines, as well as quaternary ammonium compounds, having a total of at least 15 carbon atoms in the alkyl groups. Those amines mentioned in U.S. Pat. Nos. 3,367,749; 3,972,982 and U.S. Pat. No. 4,291,007, the relevant teachings of which are incorporated herein by reference, are suitable.

Thus, a very wide range of amines either alone or mixed with known inert organic diluents such as liquid paraffinic hydrocarbons, kerosene for example, can be used in the practice of the invention.

Not only those amines as described in the above mentioned patents but solutions thereof in hydrocarbons which may be further modified by water-insoluble polar derivatives such as alcohols, ketones etc. and combinations thereof are suitable in the practice of this invention. The selection can be made quite easily by selecting amine and diluent by considerations of price, availability, stability, strength and other considerations obvious to any engineer experienced in solvent extraction.

Examples of suitable amines include tricaprylyl amines sold under the trademark ALAMINE by Henkel Corporation and quaternary amine fluorides which may be made, as described in Example 5, by converting quaternary amine chlorides, sold under the trademark ALIQUAT by Henkel Corporation, to amine fluorides.

Upon reaching equilibrium the HF-loaded amine is separated from the aqeuous solution and HF stripped therefrom in an amount sufficient to lower the HF:amine molar ratio by at least about 0.2. Methods of stripping HF from the separated amine are well known and include heating and/or washing of the HF-loaded amine. The stripped amine containing extractant is then typically recycled.

The four parameters (1. $HF:NH_4F$ molar ratio; 2. amine strength; 3. amine dilution; and 4. contact temperature) are all interdependent upon one another. Accordingly, those skilled in the art will appreciate that ranges for any one parameter cannot be precisely specified except under conditions where the three remaining parameters remain constant. In general however, the $HF:NH_4F$ molar ratio of the aqueous solution will usually be above about 0.2; the contact temperature (i.e., the temperature at which extraction takes place) will usually be between ambient temperature and the boiling point of the aqueous solution and the concentration of the amine in the extractant will usually be within the range of about 20 to 100 wt. %. The strength of the amine should be chosen according to the other parameters and the particular process used. While a stronger amine will provide more efficient extraction of HF, the recovery of HF in the final separation step will require higher temperatures. This tradeoff between extraction efficiency and ability to strip HF can be easily optimized by those skilled in the art. Accordingly, persons skilled in the art can optimize the recovery of HF from an aqueous solution containing $NH_4F$ and HF simply by adjusting these parameters in accordance with the specific teachings of the Examples herein.

One embodiment of a process utilizing the HF recovery method of the present invention will not be described. In this embodiment, 25% fluosilicic acid is reacted with ammonia (which may be a recycle stream) to precipitate silica and form an aqueous $NH_4F$ solution. This solution is conveyed to an evaporator wherein ammonia and water are evaporated, the ammonia being recycled to the first reaction while water is removed. The product stream from the evaporator is diluted and conveyed to an extraction apparatus wherein it is contacted with a water-immiscible, amine-containing extractant which usually extracts HF in preference to $NH_4F$. The amine, the concentration of the amine in the extractant, the contact temperature and the $HF:NH_4F$ molar ratio must be controlled so that the amine in the extractant achieves an HF loading of at least about 1.2.

Upon phase separation, the aqueous phase is recycled to the evaporator and the HF-loaded amine extractant is conveyed to an HF stripping apparatus wherein the loaded extractant is either heated or subjected to washing in order to strip the HF. The stripped extractant is then recycled to the extraction apparatus. In the HF stripping apparatus, HF is stripped from the amine in an amount sufficient to lower the HF:amine molar ratio by at least about 0.2.

Further advantages of the invention will be apparent from the following Examples which are illustrative of, but do not in any way limit, the scope of the present invention.

EXAMPLE 1

Two separate but identical samples of an organic liquid extractant were prepared by mixing one part by volume of tricaprylyl amine (Alamine 336, Henkel Corp.) with two parts by volume of odorless kerosene. Each of the extractant samples was equilibrated with one of two aqueous solutions containing HF and $NH_4F$. These solutions had different HF concentrations. The contact temperature for both was 50° C. In both cases two organic phases were formed in addition to the aqueous phase. The volume fraction of the heavier organic phase was about 70%. The organic and aqueous phases were then separated and separtely analyzed.

| Solution No. | Aqueous phase in equilibrium | | | Heavier Organic phase in equilibrium |
|---|---|---|---|---|
| | $NH_4$ (wt. %) | F (wt. %) | HF (wt. %) | HF:amine molar ratio |
| 1 | 10.2 | 19.6 | 9.3 | 2.51 |
| 2 | 15.4 | 33.7 | 18.3 | 2.53 |

HF extraction efficiency is measured by the HF:amine molar ratio of the organic phase. The higher the ratio, the more efficient the extraction. The lighter organic phase was substantially free of fluorine. The HF concentration was calculated as the excess F concentration on $NH_4$:F molar ratio of 1. These results show that unlike extraction of HF from HF/water solutions, the HF concentration is not the determining factor in controlling extraction efficiency in HF/$NH_4F$ systems.

EXAMPLE 2

Two identical samples of undiluted tricaprylyl amine (Alamine 336, Henkel Corp.) were each equilibrated with one of two aqueous solutions containing HF and $NH_4F$. These solutions had differing HF:$NH_4F$ molar ratios. The contact temperature in both cases was 80° C. HF concentration was calculated as in Example 1. The organic and aqueous phases were than separated and separately analyzed.

| Soln. No. | Aqueous phase in equilibrium | | | | Organic phase in equilibrium |
|---|---|---|---|---|---|
| | $NH_4$ (wt. %) | F (wt. %) | HF (wt. %) | HF:$NH_4F$ molar ratio | HF:amine molar ratio |
| 1 | 8.0 | 15.4 | 7.3 | 0.83 | 2.2 |
| 2 | 17.7 | 25.6 | 7.3 | 0.38 | 0.1 |

Although the HF concentration in the aqueous phase was the same for both samples, the extraction efficiency increased tremendously as the HF:$NH_4F$ molar ratio increased from 0.38 to 0.83. These results show that the HF:$NH_4F$ molar ratio, rather than the HF concentration, is an important parameter in controlling extraction efficiency.

EXAMPLE 3

Two identical samples of an undiluted tricaprylyl amine (Alamine 336, Henkel Corp.) were each equilibrated with one of two similar aqueous solutions containing HF and $NH_4F$. The contact temperature in one case was 50° C. and in the other case 80° C. One organic and one aqueous phase were formed in each case. The phases were separated and analyzed.

| Soln. No. | Aqueous phase in equilibrium | | | | Organic phase in equilibrium |
|---|---|---|---|---|---|
| | Equilibration Temperature (°C.) | $NH_4$ (wt. %) | F (wt. %) | HF:$NH_4F$ molar ratio | HF:amine molar ratio |
| 1 | 50 | 17.7 | 25.9 | 0.39 | 1.4 |
| 2 | 80 | 17.7 | 25.6 | 0.38 | 0.1 |

These results show that under certain conditions, the contact (i.e., equilibration) temperature can have an important effect on extraction efficiency.

EXAMPLE 4

A kerosene solution containing 33% tricaprylyl amine was equilibrated with an aqueous solution containing HF and ammonium fluoride at 25° C. Two organic phases were formed in addition to the aqueous phase. The phases were separated and analyzed. The aqueous phase in equilibrium contained 17.4% $NH_4$ and 26.8% F (HF:$NH_4F$ molar ratio of 0.46). The heavier organic phase was loaded to an HF:amine molar ratio of 1.9.

Equilibrating the same solvent with the same aqueous solution in the same ratio at 50° C., resulted in only one organic phase in addition to the aqueous phase. The HF:amine molar ratio in the organic phase was less than 0.3.

These results show that unlike in extraction of HF from HF/$H_2O$ mixtures wherein extraction is independent of termperature in the range of 2° to 60° C., changing the temperature from 25° to 50° C. has a significant effect on the efficiency of extracting HF from solutions containing HF and $NH_4F$.

EXAMPLE 5

One part by volume of methyl tricaprylyl amine chloride (Aliquat 336, Henkel Corp.) was mixed with two parts by volume of odorless kerosene. This mixture was equilibrated several times with $NH_4F$ solutions at 50° C. in order to convert the amine chloride to a fluoride. The thus obtained methyl tricaprylyl amine fluoride solution was used as the organic extractant. The extractant was equilibrated at 80° C. with an aqueous solution of HF and ammonium fluoride. Two organic phases were formed, separated from the aqueous phase and analyzed. The composition of the aqueous phase and HF content in the heavier organic phase (which was about 60% of the total organic phase volume) are compared with the results obtained for tricaprylyl amine (Example 2) in the following Table:

| Example No. | Amine | Aqueous phase in equilibrium | | | Organic phase in equilibrium |
| --- | --- | --- | --- | --- | --- |
| | | $NH_4$ (wt. %) | F (wt. %) | $HF:NH_4F$ molar ratio | HF:amine molar ratio |
| 5 | Methyl tricaprylyl amine fluoride | 16.3 | 23.7 | 0.38 | 2.8 |
| 2 | Tricaprylyl amine | 17.7 | 25.6 | 0.38 | 0.1 |

The light organic phase was substantially free of fluorine. Under similar conditions of aqueous phase composition and temperature, only 0.1 mols of HF were extracted by tricaprylyl amine whereas 1.8 mols of HF were extracted by methyl tricaprylyl amine fluoride. This demonstrates that the strength of the amine chosen to perform the extraction is an important parameter which can significantly affect HF extraction efficiency.

EXAMPLE 6

A sample of an undiluted tricaprylyl amine and a sample of a solution of tricaprylyl amine in kerosene (having a kerosene:amine volume ratio of 2:1) were each equilibrated at 50° C. with one of two similar aqueous solutions containing HF and ammonium fluoride. One organic phase and one aqueous phase were formed in both cases. The phases were separated an analyzed.

| Solution No. | amine | Aqueous phase in equilibrium | | | Organic phase in equilibrium |
| --- | --- | --- | --- | --- | --- |
| | | $NH_4$ (wt. %) | F (wt. %) | $HF:NH_4F$ molar ratio | HF:amine molar ratio |
| 1 | Undiluted amine | 17.7 | 25.9 | 0.39 | 1.4 |
| 2 | Amine in kerosene | 15.7 | 23.7 | 0.43 | 0.54 |

Under similar $HF:NH_4F$ molar ratios (somewhat more favorable $HF:NH_4F$ molar ratio for solution 2), extraction with the undiluted amine was more efficient. Thus under certain conditions, the concentration of the amine in the extractant can significantly effect the HF extraction efficiency.

EXAMPLE 7

A solvent prepared by mixing one part by volume of tricaprylyl amine with two parts by volume of odorless kerosene was equilibrated at 40° C. with an aqueous solution containing HF and ammonium fluoride. Two organic phases were formed in addition to the aqueous phase. The volume fraction of the heavier organic phase was about 80%. The phases were separated and analyzed. The $NH_4$ and F concentrations in the aqueous phase in equilibrium were 13.3% and 26.3%, respectively. The heavy organic phase was washed several times with water. The $NH_4$ concentration in the washing was analyzed to determine $NH_4F$ extraction. It was found that the $F:NH_4$ ratio in the organic phase was higher than 100 indicating selective HF extraction.

We claim:

1. A method of recovering HF from an aqueous solution containing $NH_4F$ and HF comprising:
contacting the solution with a water-immiscible, amine-containing extractant which extracts HF in preference to $NH_4F$;
adjusting one or more parameters selected from the group consisting of the $HF:NH_4F$ molar ratio of the aqueous solution, the identity of the amine, the concentration of the amine in the extractant and the contact temperature to achieve an HF:amine molar ratio in the extractant of at least about 1.2;
separating the HF-loaded amine extractant from the aqueous solution; and
stripping HF from the separated amine extractant in an amount sufficient to lower the HF:amine molar ratio in the extractant by at least about 0.2.

2. A method of recovering HF from an aqueous ammonium fluoride solution comprising:
evaporating ammonia from the aqueous ammonium fluoride solution to form an aqueous solution containing $NH_4F$ and HF;
contacting the solution containing $NH_4F$ and HF with a water-immiscible amine-containing extractant which extracts HF in preference to $NH_4F$;
adjusting one or more parameters selected from the group consisting of the identity of the amine, the concentration of the amine in the extractant and the contact temperature to achieve an HF:amine molar ratio in the extractant of at least about 1.2;
separating the HF-loaded amine extractant from the aqueous solution; and
stripping HF from the separated amine extractant in an amount sufficient to lower the HF:amine molar ratio in the extractant by at least about 0.2.

3. The method of claim 1 or 2, including recycling the stripped amine extractant for further contacting with the solution containing $NH_4F$ and HF.

4. The method of claim 1 or 2, wherein the extractant is selected from the group consisting of amines, amine-HF complexes, quaternary amine fluorides and mixtures thereof with inert organic diluents.

5. The method of claim 1 or 2, wherein the $HF:NH_4F$ molar ratio of the aqueous solution is above about 0.2.

6. The method of claim 1 or 2, wherein the contacting temperature is from about ambient temperature to about the boiling point of the aqueous solution.

7. The method of claim 4, wherein the diluent is selected from the group consisting of liquid paraffinic hydrocarbons.

8. The method of claim 7, wherein the diluent comprises kerosene.

9. The method of claim 1 or 2, wherein the extractant comprises from about 20 to about 100 weight percent amine.

10. The method of claim 1 or 2, wherein the amines are selected from the group consisting of primary amines, secondary amines, tertiary amines, and quaternary amine fluorides, said amines and quaternary amine fluorides containing alkyl groups, said amines and quaternary amine fluorides having a total of at least 15 carbon atoms.

11. The method of claim 1 or 2, wherein the HF is recovered by washing the separated amine extractant in water.

12. The method of claim 1 or 2, wherein the HF is recovered by heating the separated amine extractant.

13. The method of claim 10 wherein the amines are tricaprylyl amines and quaternary amine fluorides.

14. The method of claim 13 wherein the quaternary amine fluoride is methyl tricaprylyl amine fluoride.

* * * * *

UNITED STATES PATENT AND TRADEMARK OFFICE
CERTIFICATE OF CORRECTION

PATENT NO. : 4,882,134
DATED : November 21, 1989
INVENTOR(S) : Aharon M. Eyal and Joseph Mizrahi It is certified that error appears in the above-identified patent and that said Letters Patent is hereby corrected as shown below:

Title page, item [75]:

Add the inventor's name: Aharon M. Eyal, Rachel, Israel

Column 2, line 40, "wate-immiscible" should read --water-immiscible--.

Column 4, line 53, "not" should read --now--.

Column 5, line 27, "separtely" should read --separately--.

Signed and Sealed this

Thirteenth Day of November, 1990

Attest:

HARRY F. MANBECK, JR.

*Attesting Officer*  *Commissioner of Patents and Trademarks*